(12) United States Patent
Lai et al.

(10) Patent No.: US 8,730,690 B2
(45) Date of Patent: May 20, 2014

(54) SYSTEMS AND APPARATUS FOR REDUCING ELECTROMAGNETIC INTERFERENCE AND METHODS OF ASSEMBLING THE SAME

(75) Inventors: Rixin Lai, Clifton Park, NY (US); Joseph Smolenski, Slingerlands, NY (US)

(73) Assignee: General Electric Company, Niskayuna, NY (US)

( * ) Notice: Subject to any disclaimer, the term of this patent is extended or adjusted under 35 U.S.C. 154(b) by 583 days.

(21) Appl. No.: 12/956,835

(22) Filed: Nov. 30, 2010

(65) Prior Publication Data

US 2012/0134188 A1 May 31, 2012

(51) Int. Cl.
*H02H 7/122* (2006.01)

(52) U.S. Cl.
USPC .......................................................... 363/55

(58) Field of Classification Search
CPC .......................... H02M 2001/123; H02P 27/08
USPC ............... 363/39, 40, 50, 55, 56.01; 327/551, 327/552; 318/798, 801, 806
See application file for complete search history.

(56) References Cited

U.S. PATENT DOCUMENTS

| | | | |
|---|---|---|---|
| 5,812,020 A * | 9/1998 | Raghavan et al. ............. | 327/543 |
| 6,377,479 B1 * | 4/2002 | Ayano et al. ..................... | 363/40 |
| 6,690,230 B2 * | 2/2004 | Pelly .............................. | 327/552 |
| 6,842,069 B2 | 1/2005 | Takahashi et al. | |
| 7,385,438 B2 * | 6/2008 | Pelly .............................. | 327/551 |
| 7,583,136 B2 | 9/2009 | Pelly | |
| 7,701,159 B2 * | 4/2010 | Chida et al. .............. | 318/400.01 |
| 2010/0219902 A1 | 9/2010 | Schutten et al. | |

FOREIGN PATENT DOCUMENTS

| | | |
|---|---|---|
| EP | 1085649 A2 | 3/2001 |
| EP | 1447903 A2 | 8/2004 |
| JP | 20101544662 A | 7/2010 |

OTHER PUBLICATIONS

M. Cacciato et al., IEEE Industry Applications Conference; vol. 1, pp. 707-714; Oct. 1997.

S. Wang et al., IEEE Transactions on Power Electronics; vol. 25, No. 4; pp. 1034-1045; Apr. 2010.

Jettanasen, C., et al., Minimization of Common-Mode Conducted Noise in PWM Inverter-fed AC Motor Drive Systems using Optimized Passive EMI Filter, International MultiConference of Engineers and Computer Scientists, Mar. 2010, 4 pages, vol. II.

* cited by examiner

*Primary Examiner* — Matthew Nguyen
(74) *Attorney, Agent, or Firm* — Scott J. Asmus

(57) ABSTRACT

An electric machine drive system is described. The system includes an inverter, an electric machine coupled to the inverter by at least one output conductor and including a ground connection, and an active common mode current reducing device coupled between the ground connection of the electric machine and the inverter.

11 Claims, 4 Drawing Sheets

SYSTEMS AND APPARATUS FOR REDUCING ELECTROMAGNETIC INTERFERENCE AND METHODS OF ASSEMBLING THE SAME

BACKGROUND OF THE INVENTION

The embodiments described herein relate generally to an electric machine drive system, and more particularly, to reducing a level of common mode current applied to ground by an electric machine drive system.

A three phase inverter may be used to drive an electric machine, for example, an induction motor or a permanent magnet motor. Such an inverter typically provides favorable control and efficiency. However, the switching pattern of power semiconductor devices typically included in the inverter may generate an electromagnetic interference (EMI) current. Using shielded cables to couple the inverter and the electric motor reduces the EMI current, including a common mode current component of the EMI current. Unfortunately, shielded cables are not suitable for use in all applications. Common mode inductors may also be used to reduce common mode current, except that size constraints may prevent use of such inductors. An active circuit that injects a common mode current in a DC input side of the inverter may be used to condition the DC power applied to the inverter. Such a circuit, though, does not reduce the common mode current present at the electric motor, especially when the inverter and electric motor are coupled by a long unshielded cable. Furthermore, a controlled voltage source may be included at the AC output of the inverter to cancel the common mode voltage generated by the inverter, and therefore reduce the common mode current. Reducing the common mode current in this manner, however, requires a transformer in series with the cable that couples the inverter to the electric motor.

BRIEF DESCRIPTION OF THE INVENTION

In one aspect, an electric machine drive system is provided. The system includes an inverter, an electric machine coupled to the inverter by at least one output conductor and including a ground connection, and an active common mode current reducing device coupled between the ground connection of the electric machine and the inverter.

In another aspect, an active common mode current reducing device positioned between an inverter and a load is provided. The inverter is coupled to the load by at least one unshielded output conductor. The active common mode current reducing device includes a current sensing device configured to sense a level of common mode current flowing through the at least one output conductor. The active common mode current reducing device also includes a controlled current source coupled between the inverter and the load and configured to receive a current level signal from the current sensing device.

In yet another aspect, a method for reducing common mode current applied to ground in a system that includes an inverter and a load. The method includes coupling the inverter to the load using at least one output conductor. The method also includes coupling an active common mode current reducing device between the inverter and the load, in parallel with the at least one output conductor.

DETAILED DESCRIPTION OF THE INVENTION

The methods, systems, and apparatus described herein facilitate actively reducing a common mode current output by an inverter used to drive an electric motor. More specifically, an alternative path is provided that forces the common mode current present at the electric motor to return to the inverter rather than being injected to ground.

Technical effects of the methods, systems, and apparatus described herein include at least one of: (a) coupling an inverter to a load using at least one output conductor; and (b) coupling an active current reducing device between the inverter and the load, in parallel with the at least one output conductor.

Figure 1:
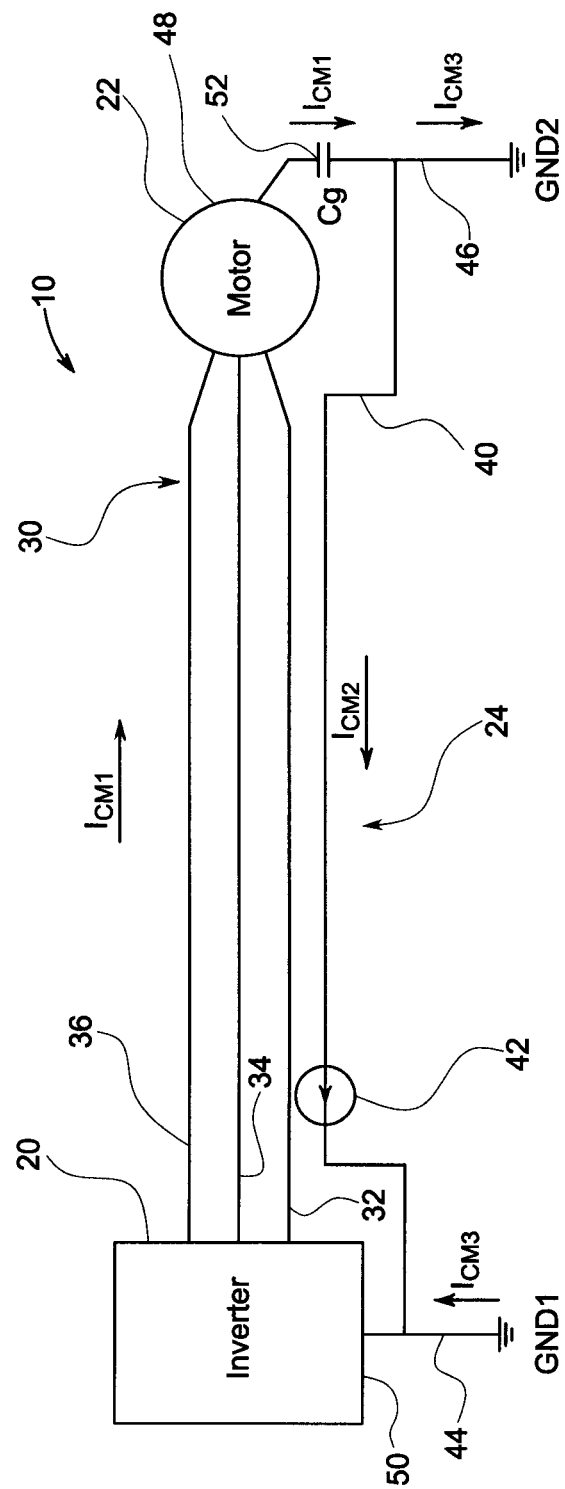
FIG. 1 is a block diagram of an exemplary embodiment of an electric motor drive system.

FIG. 1 is a block diagram of an exemplary embodiment of an electric machine drive system 10. In the exemplary embodiment, electric machine drive system 10 includes an inverter 20, an electric machine, for example, an electric motor 22, and an active common mode current reducing device 24. Although referred to herein as electric motor 22, the embodiments described herein may be applied to any suitable electric machine, including, but not limited to, an induction machine or a permanent magnet machine. Inverter 20 is illustrated as a three phase inverter, however, inverter 20 may include a single phase or any suitable number of phases that allows system 10 to function as described herein. Moreover, active common mode current reducing device 24 is not limited to use within electric machine drive system 10. Rather, active common mode current reducing device 24 may be included within any suitable system that includes an inverter coupled to a load to facilitate reducing the common mode current applied to ground.

In the exemplary embodiment, inverter 20 is coupled to electric motor 22 by at least one output conductor 30. For example, the at least one output conductor 30 may include a first output cable 32, a second output cable 34, and a third output cable 36. Although described herein as output cables 32, 34, and 36, the at least one output conductor 30 may include a wire, a cable, a bus, or any other current carrying conductor that allows system 10 to function as described herein. Furthermore, although described herein as including three output cables 32, 34, and 36, system 10 may include any number of conductors that allows system 10 to function as described herein. Switching patterns of power semiconductor devices (not shown in FIG. 1) in inverter 20 may induce electromagnetic interference (EMI) current in the at least one conductor 30. EMI current includes a common mode current component. Use of shielded cables between inverter 20 and electric motor 22 may reduce the EMI current. However, in some applications, maintenance requirements and/or thermal constraints prevent coupling inverter 20 and electric motor 22 using shielded cable. In the exemplary embodiment, output cables 32, 34, and 36 are unshielded cables.

In the exemplary embodiment, active common mode current reducing device 24 includes a return conductor 40 and a controlled current source 42. Device 24 is positioned within electric motor drive system 10 in parallel with the at least one output conductor 30. Return conductor 40 is coupled between a ground 44 of inverter 20 and a ground 46 of electric motor 22. In the exemplary embodiment, electric motor 22 includes a grounded chassis 48 and inverter 20 also includes a grounded chassis 50. A parasitic capacitor 52 couples windings within electric motor 22 to electric motor chassis 48. Capacitor 52 is a main path for common mode current passing from electric motor 22 to ground 46. Return conductor 40 is connected between electric motor chassis 48 and inverter chassis 50 to provide an active shielding of output cables 32, 34, and 36. In the exemplary embodiment, ground 44 and ground 46 are a shared electrical ground, also referred to herein as a ground network. Furthermore, in the exemplary embodiment, return conductor 40 is positioned close to output conductor 30 in order to minimize a loop area and reduce inductance. Return conductor 40 follows a path of output conductor 30 and is substantially equal in length to output conductor 30.

Common mode current ($I_{CM1}$) generated by switching within inverter 20 flows through output cables 32, 34, and 36 to electric motor 22. Typically, $I_{CM1}$ flows out of electric motor 22 to ground 46. There are defined limits on a level of common mode current ($I_{CM3}$) that may be injected to ground 46 in order to prevent a first device from interfering with the operation of a second device coupled to a common ground (e.g., a ground network shared by the first device and the second device). For example, common mode current from a motor may interfere with operation of an instrument coupled to the ground network. In the exemplary embodiment, active common mode current reducing device 24 causes a current ($I_{CM2}$) to return to inverter 20 rather than being injected to ground 46. In other words, device 24 diverts $I_{CM2}$ into return conductor 40, reducing the common mode current ($I_{CM3}$) injected to ground 46.

Figure 2:
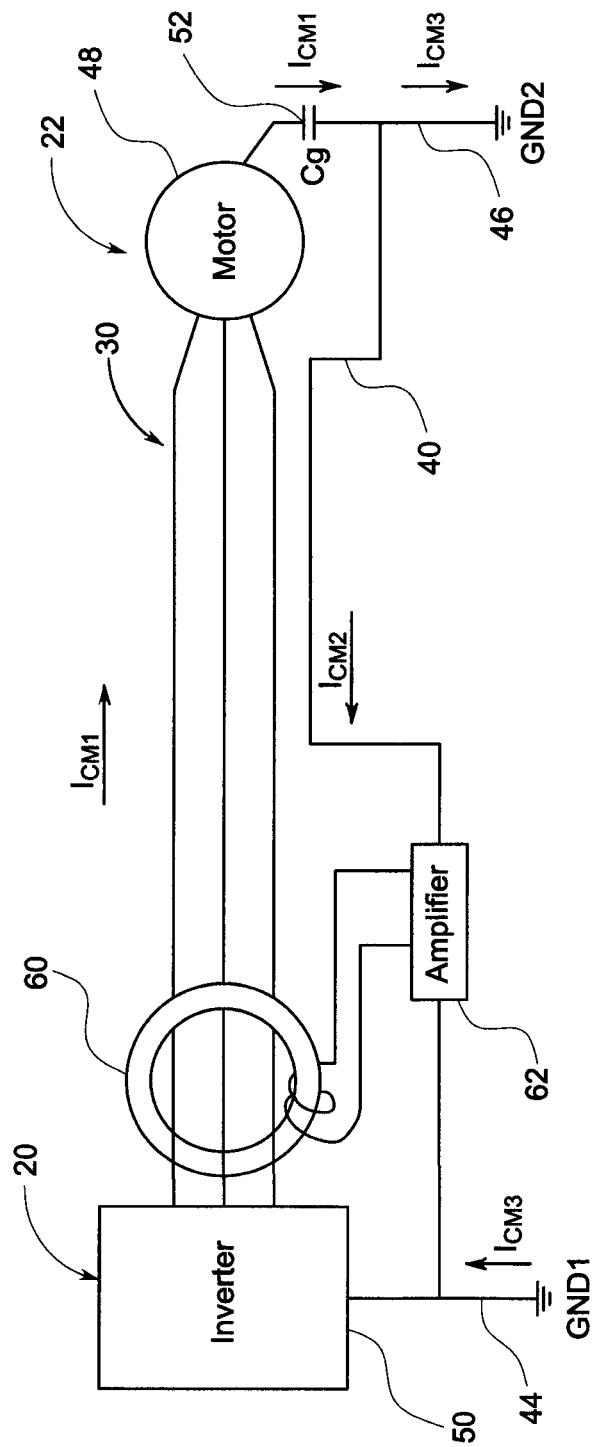
FIG. 2 is a block diagram of an exemplary embodiment of the active common mode current reducing device shown in FIG. 1.

FIG. 2 is a block diagram of an exemplary embodiment of active common mode current reducing device 24 (shown in FIG. 1). As described above, active common mode current reducing device 24 is included within electric motor drive system 10. Furthermore, device 24 includes return conductor 40 and controlled current source 42. In the exemplary embodiment, device 24 also includes a current sensing device 60 and an amplifier circuit 62. Current sensing device 60 may include, but is not limited to, a current transformer, for example, a single-turn current transformer. Current sensing device 60 senses the common mode current ($I_{CM1}$) flowing through output cables 32, 34, and 36 and provides a common mode current signal corresponding to the sensed common mode current ($I_{CM1}$) to amplifier circuit 62. Amplifier circuit 62 generates a current ($I_{CM2}$) within return conductor 40 substantially equal to the sensed common mode current ($I_{CM1}$). Generating $I_{CM2}$ in return conductor 40 facilitates reducing common mode ground current ($I_{CM3}$).

Figure 3:
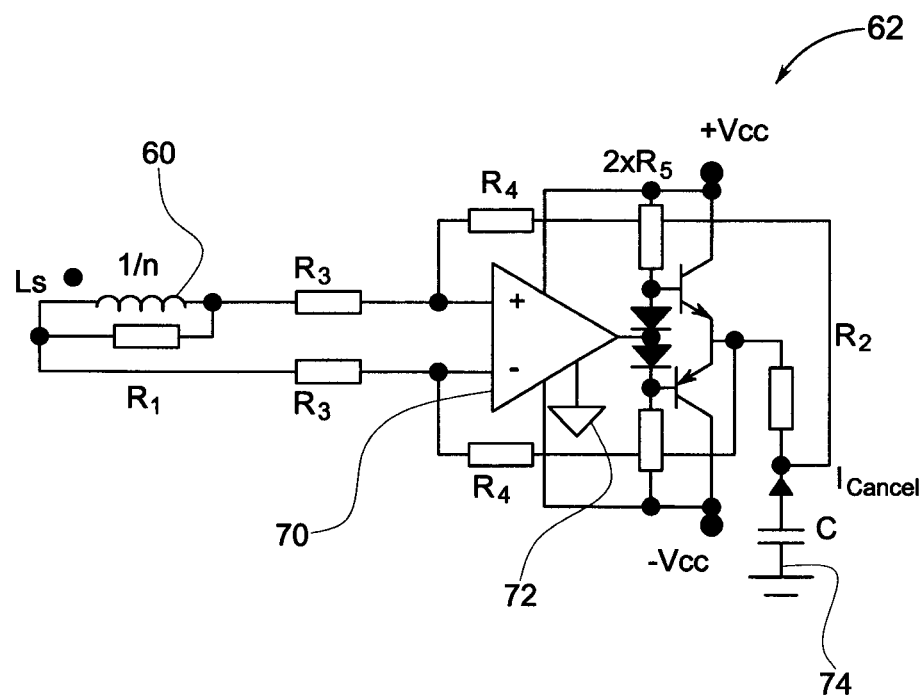
FIG. 3 is a circuit diagram of an exemplary embodiment of the amplifier circuit shown in FIG. 2.

FIG. 3 is a circuit diagram of an exemplary embodiment of amplifier circuit 62 (shown in FIG. 2). In the exemplary embodiment, amplifier circuit 62 is a one-stage operational amplifier circuit, which includes an operational amplifier 70 configured to receive an output of current sensing device 60 and other components configured to generate current ($I_{CM2}$) in return conductor 40. A ground connector 72 of operational amplifier 70 is coupled to inverter ground 44 (shown in FIG. 1) and an output 74 of amplifier circuit 62 is coupled to electric motor ground 46 (shown in FIG. 1) via return conductor 40. The circuit shown in FIG. 3 is provided as an example only. Any other circuit or device that induces a controlled current into return conductor 40 may be included within device 24.

Accordingly, device 24 senses the common mode current ($I_{CM1}$) flowing through output cables 32, 34, and 36 and generates a substantially equal amount of current ($I_{CM2}$) in return conductor 40. Therefore the current through the ground ($I_{CM3}$) will be largely reduced. Furthermore, in many applications, return conductor 40 can be a low-gauge cable, due to the low current flowing through return conductor 40 (e.g., only common mode current $I_{CM2}$ flows through return conductor 40).

Figure 4:
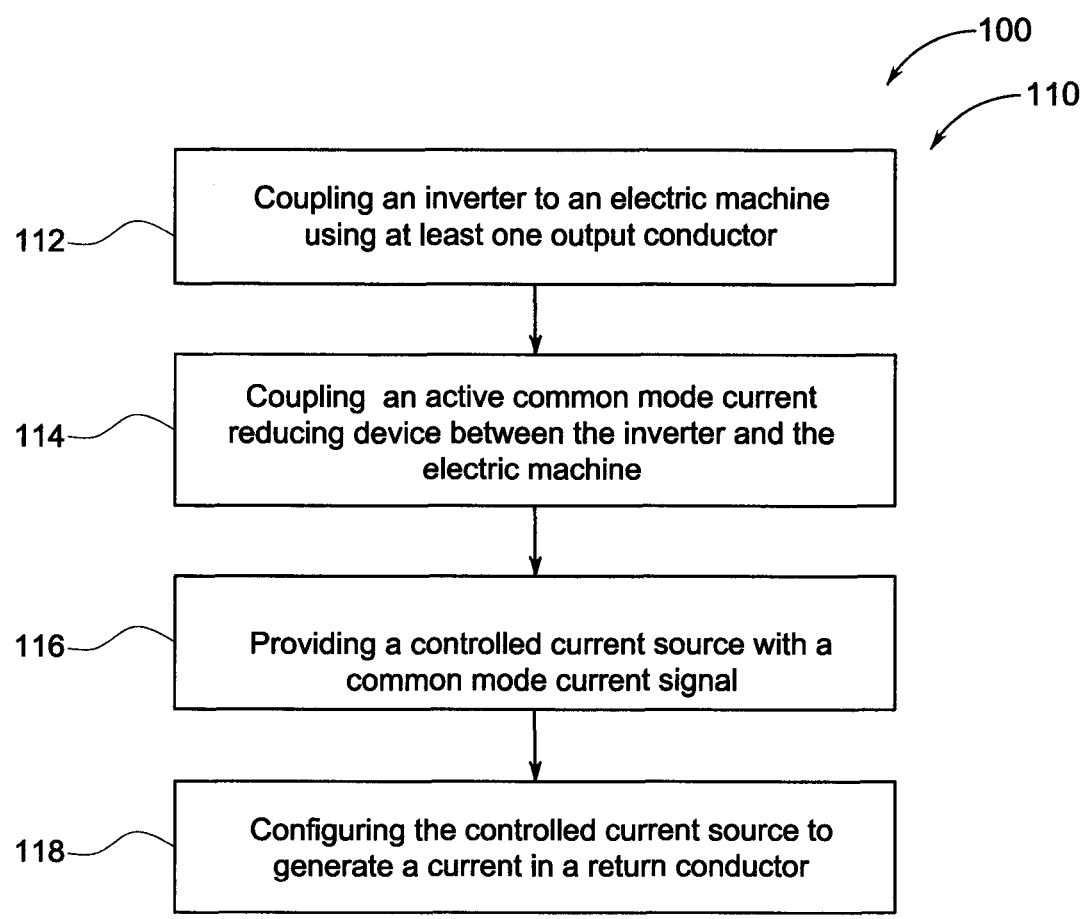
FIG. 4 is a flow chart of an exemplary method for reducing common mode current applied to ground in a motor drive system, for example, the motor drive system shown in FIG. 1.

FIG. 4 is a flow chart 100 of an exemplary method 110 for reducing common mode current applied to ground in a motor drive system, for example, motor drive system 10 (shown in FIG. 1). Motor drive system 10 includes an inverter, for example, inverter 20 (shown in FIG. 1) and an electric machine, for example, electric motor 22 (shown in FIG. 1). In the exemplary embodiment, method 110 includes coupling 112 inverter 20 to electric motor 22 using at least one conductor, for example, the at least one output conductor 30 (shown in FIG. 1). The at least one output conductor 30 may include output cables 32, 34, and 36 (shown in FIG. 1). In the exemplary embodiment, output cables 32, 34, and 36 are unshielded cables. Method 110 also includes coupling 114 an active common mode current reducing device, for example, device 24 (shown in FIG. 2) between inverter 20 and electric motor 22, in parallel with the at least one output conductor 30.

Coupling 114 device 24 may include coupling a return conductor, for example, return conductor 40 (shown in FIG. 1), and a controlled current source, for example, controlled current source 42 (shown in FIG. 1) between a grounded chassis of inverter 20 and a grounded chassis of electric motor 22. Coupling 114 device 24 may also include positioning a current sensing device, for example, current sensing device 60 (shown in FIG. 2) within motor control system 10 and configuring current sensing device 60 to sense a common mode current ($I_{CM1}$) within the at least one output conductor 30.

Furthermore, method 110 may also include providing 116 controlled current source 42 with a common mode current signal corresponding to the common mode current ($I_{CM1}$) within the at least one output conductor 30, and configuring 118 controlled current source 42 to generate a current ($I_{CM2}$) in return conductor 40 substantially equal to the common mode current ($I_{CM1}$) within the at least one output conductor 30.

Described herein are exemplary methods, systems, and apparatus for reducing the common mode current applied to ground in a system that includes an inverter coupled to a load by unshielded conductors. More specifically, the methods, systems, and apparatus described herein reduce the common mode current in a ground network between the inverter and an electric motor. The methods, systems, and apparatus described herein facilitate actively reducing a common mode current applied to ground in a motor control system that includes an inverter and an electric motor coupled by unshielded cables. An active common mode current reducing device is coupled between a grounded chassis of the inverter and a grounded chassis of the electric motor. The active common mode current reducing device is light-weight when compared to common mode inductors and/or shielded cables often used to suppress common mode current. Furthermore, the active common mode current reducing device may be relatively small since the device only carries the common mode current. Weight and size density are especially important in the aviation industry. The embodiments described herein facilitate reducing the size and weight of an electric machine drive system by reducing or eliminating an output common mode choke and/or cable shielding, which are typically bulky components in the motor drive system. Therefore, the methods, systems, and apparatus described herein facilitate reducing a size and a weight of an output common mode choke included within a motor control system. The methods, systems, and apparatus described herein are especially effectively in applications where shielded cable is undesirable or cannot be used.

The methods, systems, and apparatus described herein facilitate efficient and economical reduction in common mode ground current generated by an inverter used to drive an electric motor. Exemplary embodiments of methods, systems, and apparatus are described and/or illustrated herein in detail. The methods, systems, and apparatus are not limited to the specific embodiments described herein, but rather, components of each apparatus and/or system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric machine drive system comprising:
   an inverter;
   an electric machine coupled to the inverter by at least one output conductor and including a ground connection, wherein the at least one output conductor comprises at least one unshielded conductor; and
   an active common mode current reducing device coupled between the ground connection of the electric machine and the inverter, wherein the active common mode current reducing device comprises a controlled current source.

2. A system in accordance with claim 1, further comprising a current sensing device configured to measure an alternating current (AC) common mode current level in the at least one output conductor and to provide the measured AC common mode current level to the controlled current source.

3. A system in accordance with claim 2, wherein the current sensing device comprises a current transformer.

4. A system in accordance with claim 2, wherein the controlled current source is configured to generate a current substantially equal to the measured AC common mode current level.

5. A system in accordance with claim 1, wherein the electric machine comprises a grounded chassis and the inverter comprises a grounded chassis, the active common mode current reducing device is coupled between the electric machine chassis and the inverter chassis to provide an active shielding of the at least one output conductor.

6. A system in accordance with claim 1, wherein the active common mode current reducing device is coupled in parallel with the at least one output conductor.

7. A system in accordance with claim 1, wherein the active common mode current reducing device is configured to reduce the common mode current applied to a ground network between the inverter and the electric machine.

8. A method for reducing common mode current applied to ground in a system including an inverter and a load, said method comprising:
   coupling the inverter to the load using at least one output conductor, wherein the at least one output conductor comprises at least one unshielded conductor; and
   coupling an active common mode current reducing device between the inverter and the load and in parallel with the at least one output conductor, wherein coupling the active common mode current reducing device comprises coupling at least one return conductor and a controlled current source between a grounded chassis of the inverter and a grounded chassis of the load.

9. A method in accordance with claim 8, wherein coupling the active common mode current reducing device further comprises positioning a current sensing device within the system and configuring the current sensing device to sense a common mode current within the at least one output conductor.

10. A method in accordance with claim 9, wherein positioning a current sensing device within the system comprises positioning a current transformer at least partially around the at least one output conductor.

11. A method in accordance with claim 9, further comprising:
   providing the controlled current source with a common mode current signal corresponding to the common mode current within the at least one output conductor; and
   configuring the controlled current source to generate a current in the at least one return conductor substantially equal to the common mode current within the at least one output conductor.

* * * * *